US010967813B2

(12) United States Patent
Ishigooka et al.

(10) Patent No.: US 10,967,813 B2
(45) Date of Patent: Apr. 6, 2021

(54) VEHICLE CONTROL DEVICE (71) Applicant: Hitachi Automotive Systems, Ltd., Hitachinaka (JP)

(72) Inventors: Tasuku Ishigooka, Tokyo (JP); Tomohito Ebina, Hitachinaka (JP); Kazuyoshi Serizawa, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 157 days.

(21) Appl. No.: 16/338,616

(22) PCT Filed: Oct. 24, 2017

(86) PCT No.: PCT/JP2017/038335
§ 371 (c)(1),
(2) Date: Apr. 1, 2019

(87) PCT Pub. No.: WO2018/084024
PCT Pub. Date: May 11, 2018

(65) Prior Publication Data
US 2019/0232891 A1 Aug. 1, 2019

(30) Foreign Application Priority Data

Nov. 2, 2016 (JP) .............................. JP2016-215559

(51) Int. Cl.
*G06F 12/14* (2006.01)
*B60R 16/02* (2006.01)
*G06F 3/06* (2006.01)
(52) U.S. Cl.
CPC ............ *B60R 16/02* (2013.01); *G06F 3/0622* (2013.01); *G06F 12/14* (2013.01); *G06F 2212/1052* (2013.01)

(58) Field of Classification Search
CPC .... G06F 3/0622; G06F 3/062; G06F 12/1425; G06F 12/14; G06F 12/1441; G06F 21/64;
(Continued)

(56) References Cited

U.S. PATENT DOCUMENTS 5,627,987 A    5/1997  Nozue et al.
9,389,793 B2 * 7/2016  Soja .................... G06F 12/1425
(Continued)

FOREIGN PATENT DOCUMENTS

JP     5-257811 A     10/1993
JP  2003-316645 A     11/2003
(Continued)

OTHER PUBLICATIONS

International Search Report (PCT/ISA/210) issued in PCT Application No. PCT/JP2017/038335 dated Jan. 30, 2018 with English translation (four (4) pages).
(Continued)

*Primary Examiner* — Ernest Unelus
(74) *Attorney, Agent, or Firm* — Crowell & Moring LLP (57) ABSTRACT

The present invention provides a vehicle control device capable of realizing access authority definitions by the number equal to or greater than the number of access control registers provided in a memory protection device. In the vehicle control device according to the present invention, the whole or a part of a storage device that stores the access authority definitions used by the memory protection device to control the access authorities, is allocated fixedly to a memory area in advance and the rest is allocated dynamically.

8 Claims, 9 Drawing Sheets

(58) Field of Classification Search
CPC ...... G06F 21/79; G06F 3/1491; G06F 3/1483; G06F 2212/1052
See application file for complete search history.

(56) References Cited

U.S. PATENT DOCUMENTS

| | | |
|---|---|---|
| 2003/0177332 A1 | 9/2003 | Shiota |
| 2004/0064723 A1* | 4/2004 | Barnes et al. ...... G06F 12/1491 713/201 |
| 2009/0240923 A1* | 9/2009 | Covey ................. G06F 9/30076 712/220 |

FOREIGN PATENT DOCUMENTS

| | | |
|---|---|---|
| JP | 2013-140477 A | 7/2013 |
| JP | 2015-67107 A | 4/2015 |

OTHER PUBLICATIONS

Japanese-language Written Opinion (PCT/ISA/237) issued in PCT Application No. PCT/JP2017/038335 dated Jan. 30, 2018 (four (4) pages).

* cited by examiner

| ID | TASK | CYCLE | PRIORITY | PID |
|----|------|-------|----------|-----|
| 1 | ASIL-D | 100us | 1 | 1 |
| 2 | ASIL-B | 1ms | 2 | 2 |
| 3 | QM | 1ms | 3 | 4 |

| No | SOFTWARE | STARTING ADDRESS | ENDING ADDRESS | PRIVILEGED MODE | | | USER MODE | | | PID |
|----|----------|------------------|----------------|---|---|---|---|---|---|-----|
| | | | | R | W | X | R | W | X | |
| 1 | OS | 0x0000 | 0x0FFF | 1 | 1 | 1 | 1 | 0 | 0 | 1 |
| 2 | ASIL D | 0x1000 | 0x1FFF | 1 | 1 | 1 | 1 | 0 | 0 | 1 |
| 3 | ASIL B | 0x2000 | 0x2FFF | 1 | 0 | 0 | 1 | 1 | 1 | 2 |
| 4 | QM | 0x3000 | 0x3FFF | 1 | 0 | 0 | 1 | 1 | 1 | 4 |
| ... | ... | ... | ... | - | - | - | - | - | - | ... |

| No | SOFTWARE | STARTING ADDRESS | ENDING ADDRESS | PRIVILEGED MODE | | | USER MODE | | | PID |
|---|---|---|---|---|---|---|---|---|---|---|
| | | | | R | W | X | R | W | X | |
| 1 | ASIL B | 0x2000 | 0x3000 | 1 | 0 | 0 | 1 | 1 | 1 | 2 |
| 2 | QM | 0x3000 | 0x4000 | 1 | 0 | 0 | 1 | 1 | 1 | 4 |
| ... | ... | ... | ... | ... | ... | ... | ... | ... | ... | ... |

| REGISTER ID (1411) | STARTING ADDRESS (1412) | ENDING ADDRESS (1413) | PRIVILEGED MODE (1414) | | | USER MODE (1415) | | | PID (1416) |
|---|---|---|---|---|---|---|---|---|---|
| | | | R | W | X | R | W | X | |
| 1 | 0x2000 | 0x3000 | 1 | 0 | 0 | 1 | 1 | 1 | 0 |

*
*
*

| REGISTER ID | STARTING ADDRESS | ENDING ADDRESS | PRIVILEGED MODE | | | USER MODE | | | PID |
|---|---|---|---|---|---|---|---|---|---|
| | | | R | W | X | R | W | X | |
| 8 | | | | | | | | | |

| NUMBER OF REGISTERS |
|---|
| 10 |

VEHICLE CONTROL DEVICE

TECHNICAL FIELD

The present invention relates to a vehicle control device that controls the operation of a vehicle.

BACKGROUND ART

A vehicle control system including electronic control units (ECUs) that control the operation of a vehicle, controls the vehicle with the ECUs cooperating through communication. Development of a recent vehicle control system requires compliance with a functional safety standard, such as ISO 26262. The system requires developing with a development process based on safety levels.

In order to equip one ECU with a software group in which each piece of software has a different safety level, it is required to implement Freedom From Interference (FFI) that causes no mutual interference between the pieces of software having the respective different safety levels. In order to implement the FFI, it is required to implement a memory protection function, a time protection function, and a data protection function.

Use of a memory protection unit enables implementation of the memory protection function. Writing of information defining an access authority into an access control register causes the memory protection unit to perform access control such that a central processing unit (CPU) accesses a memory in accordance with the definition. Use of the memory protection unit allows control of an access authority to a specific memory address area in accordance with the operation mode of the CPU (e.g., supervisor mode or user mode), resulting in detection of access to a memory address area to which no access is permitted, as unauthorized access.

The following PTL 1 discloses that a plurality of access control registers each stores a different access authority definition in advance, and selection of any of the definitions of the access control registers, for application to the same memory address area, allows detailed control of access authority.

CITATION LIST

Patent Literature

PTL 1: JP 2015-067107 A

SUMMARY OF INVENTION

Technical Problem

The technique described in the above PTL 1 is difficult to use, at least remaining intact in a case where the number of access authorities to be defined is more than the number of access control registers. For example, in a case where an access authority is defined for every memory address area, the number of memory address areas is more than the number of access control registers in some cases. Thus, the technique is likely to have difficulty in complying with the functional safety standard requiring complete realization of FFI.

The present invention has been made in order to solve the problem, and an object of the present invention is to provide a vehicle control device capable of realizing the number of access authority definitions that is not less than the number of access control registers included in a memory protection unit.

Solution to Problem

In a vehicle control device according to the present invention, the entirety or part of storage devices each storing an access authority definition to be used by a memory protection unit for control of access authority is allocated fixedly, in advance, to a memory area, and the rest is allocated dynamically.

Advantageous Effects of Invention

A vehicle control device according to the present invention allocates dynamically at least part of storage devices each storing an access authority definition, in a memory protection unit, so that the number of access authority definitions not less than the number of storage devices can be realized.

DESCRIPTION OF EMBODIMENTS

First Embodiment

Figure 1:
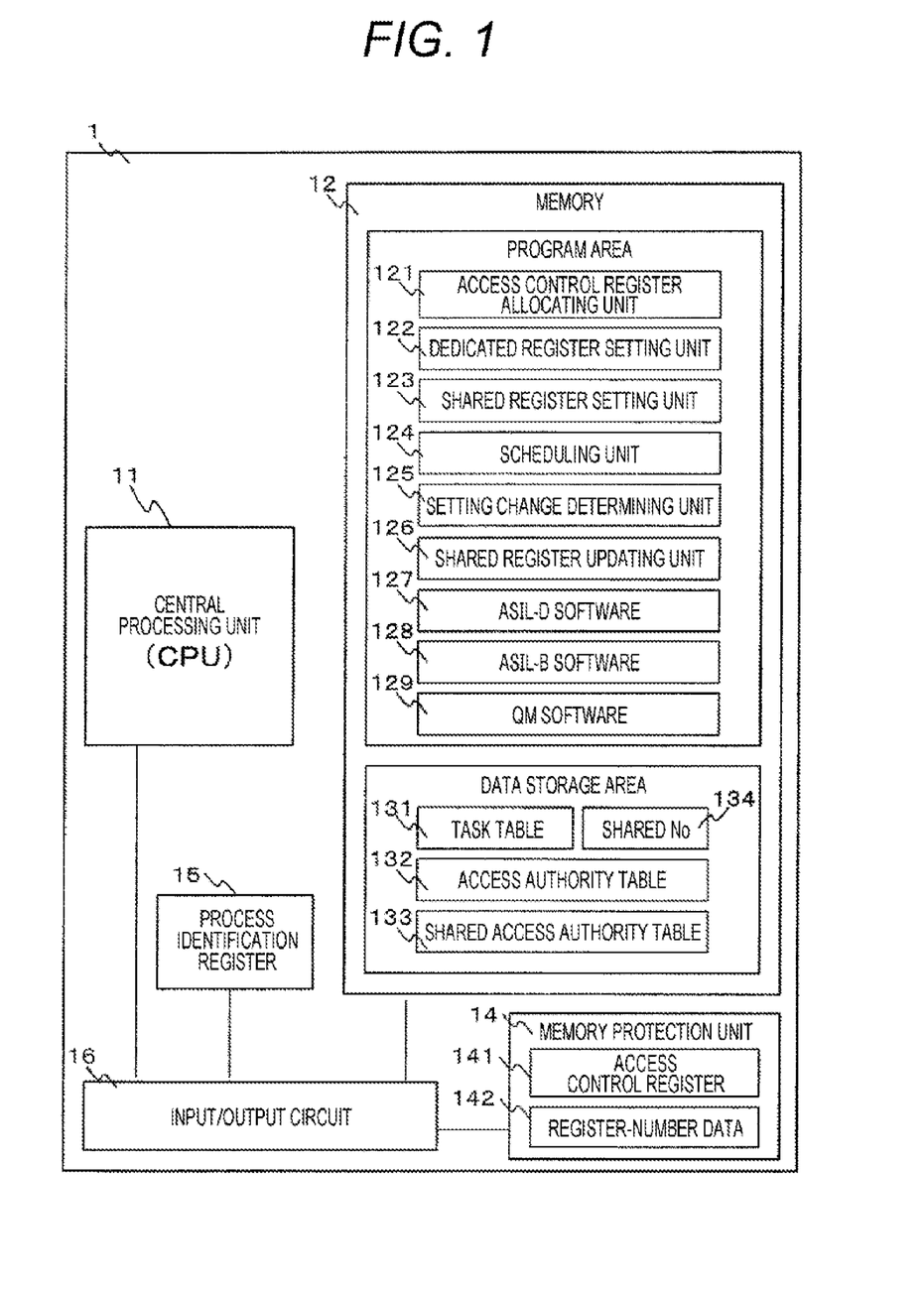
FIG. 1 is a diagram of the configuration of a vehicle control device 1 according to a first embodiment.

FIG. 1 is a diagram of the configuration of a vehicle control device 1 according to a first embodiment of the present invention. The vehicle control device 1 includes a central processing unit 11, a memory 12, a memory protection unit 14, a process identification register 15, and an input/output circuit 16. The memory 12 includes a program area and a data storage area.

The program area stores an access control register allocating unit 121, a dedicated register setting unit 122, a shared register setting unit 123, a scheduling unit 124, a setting change determining unit 125, and a shared register updating unit 126. The program area further stores, as software of controlling the operation of a vehicle, ASIL-D software 127, ASIL-B software 128, and QM software 129.

The data storage area stores a task table 131, an access authority table 132, a shared access authority table 133, and shared No 134. The details of these pieces of data will be described later.

The memory protection unit 14 includes a plurality of access control registers 141 and register-number data 142 indicating the number of access control registers. The memory protection unit 14 controls access to the memory 12, in accordance with an access authority definition written in each access control register 141.

The details of each part included in the memory protection unit 14, will be described later.

The process identification register 15 provides the process ID (PID) of shared software (to be described later) being executed by the central processing unit 11. The central processing unit 11 accesses to the memory 12 through the input/output circuit 16, and the memory protection unit 14 monitors the access to the memory 12 through the input/output circuit 16.

Figure 2:
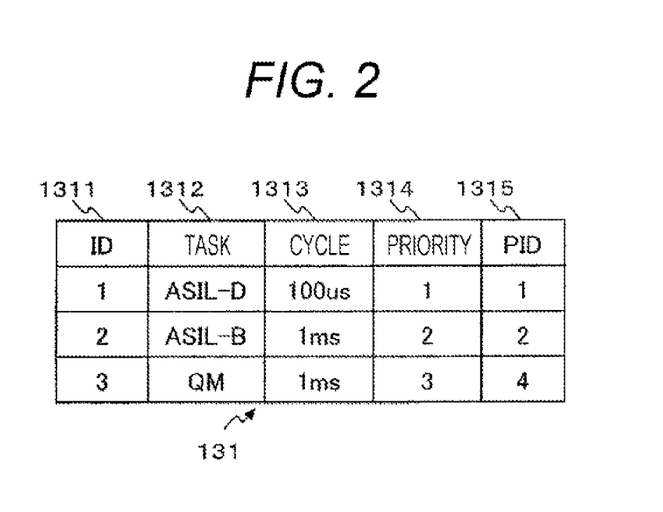
FIG. 2 illustrates the configuration of a task table 131 and exemplary data.

FIG. 2 illustrates the configuration of the task table 131 and exemplary data. The task table 131 is a data table defining the attribute of a task to be executed by the central processing unit 11. Here, it is assumed that a plurality of pieces of software each is included in one task, and the attribute is defined for every task. The task table 131 includes, as data fields, an ID 1311, a task 1312, a cycle 1313, priority 1314, and a PID 1315.

The ID 1311 indicates identifiers each for identifying a record in the task table 131. The task 1312 indicates the name of each task. Here, a safety level required for each task is substituted for a task name. The cycle 1313 indicates the execution cycle of each task. The priority 1314 indicates the priority of each task. The PID 1315 indicates respective identifiers allocated to the tasks.

Figure 3:
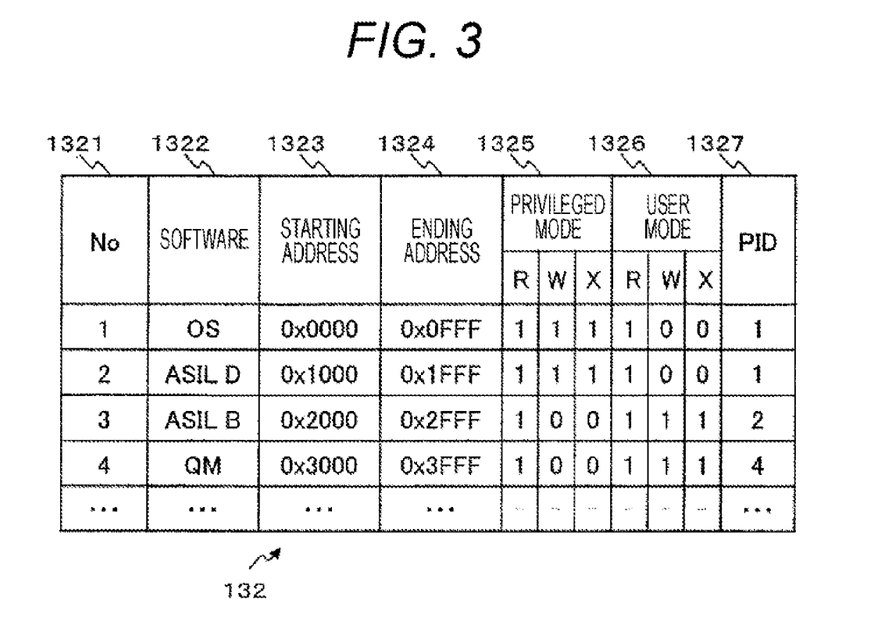
FIG. 3 illustrates the configuration of an access authority table 132 and exemplary data.

FIG. 3 illustrates the configuration of the access authority table 132 and exemplary data. The access authority table 132 is a data table defining access authority in advance for a memory address area to which each piece of software accesses. One access authority definition (one record in the access authority table 132) is stored to one access control register 141. In some cases, the number of access authorities defined by the access authority table 132 is more than the number of access control registers 141. Therefore, on the basis of a process to be described later, the entirety or part of the access authorities defined by the access authority table 132 are stored fixedly to access control registers 141, and the rest is stored dynamically.

Software that uses an access authority definition stored fixedly in an access control register 141, has the access authority definition allocated fixedly. Software that uses an access authority definition stored dynamically in an access control register 141 shares the access control register 141.

The access authority table 132 includes, as data fields, No 1321, software 1322, a starting address 1323, an ending address 1324, a privileged mode 1325, a user mode 1326, and a PID 1327.

The No 1321 includes numbers for identifying the records in the access authority table 132. The software 1322 indicates the name of the software included in each task. The starting address 1323 indicates the starting addresses of the memory address areas in which access control is performed to the pieces of software indicated in the software 1322. The ending address 1324 indicates corresponding ending addresses. The privileged mode 1325 indicates an access authority when the central processing unit 11 accesses, in privileged mode, to each memory address area indicated by the starting address 1323 and the ending address 1324. The user mode 1326 indicates an access authority when the central processing unit 11 accesses, in the user mode, to each memory address area indicated by the starting address 1323 and the ending address 1324. The PID 1327 includes identifiers allocated to the software 1322, and corresponds to the PID 1315.

For example, the second-row record of FIG. 3 indicates that the software "ASIL D" with "PID=1" is permitted in terms of reading, writing, and execution in the privileged mode and is permitted in terms of only reading in the user mode, to the memory address area from "0x1000" to "0x1FFF".

Figure 4:
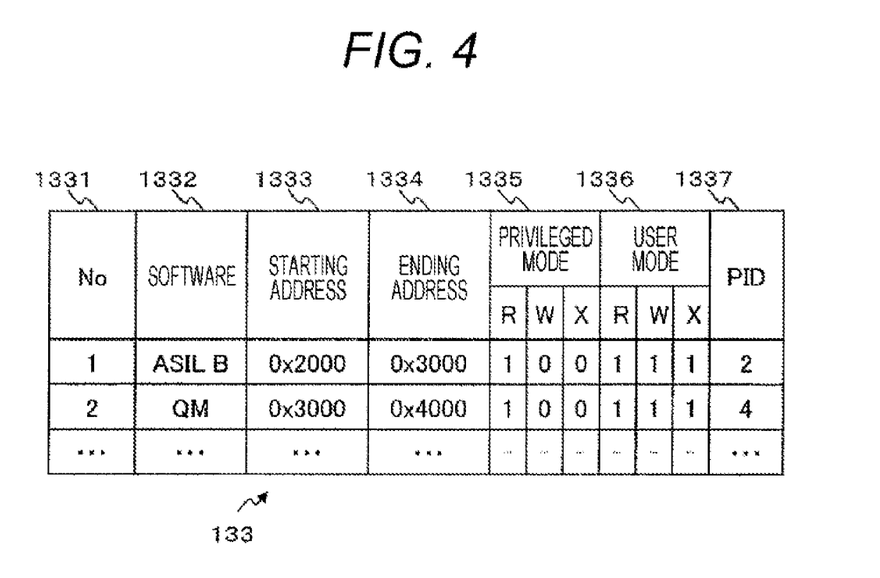
FIG. 4 illustrates the configuration of a shared access authority table 133 and exemplary data.

FIG. 4 illustrates the configuration of the shared access authority table 133 and exemplary data. The memory protection unit 14 does not necessarily include the number of access control registers 141 capable of storing all the access authority definitions. Thus, according to the present invention, access authority definitions are stored into access control registers 141, and additionally an access authority definition that has not been stored into the access control registers 141, is saved into the shared access authority table 133. Software of which the access authority definition is saved in the shared access authority table 133, is referred to as "shared software" for convenience. FIG. 4 exemplifies that access authority definitions are already stored for some pieces of shared software.

The shared access authority table 133 includes, as data fields, No 1331, software 1332, a starting address 1333, an ending address 1334, a privileged mode 1335, a user mode 1336, and a PID 1337. Except for the description of the shared software, these data fields are similar to the data fields of the access authority table 132.

Figure 5:
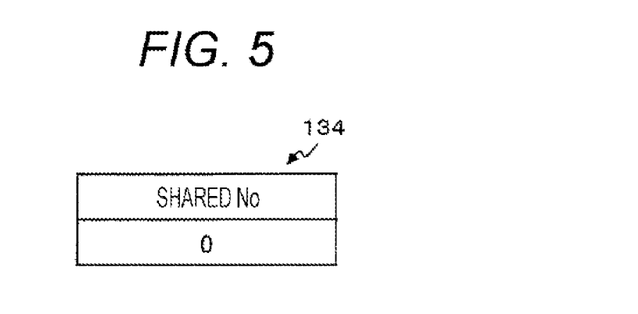
FIG. 5 illustrates an example of shared No 134.

FIG. 5 illustrates an example of the shared No 134. The shared No 134 stores the No 1331 corresponding to an access authority definition by being written in an access control register 141, from the access authority definitions retained by the shared access authority table 133, the access authority definition being currently used when the memory protection unit 14 performs access control. In other words, an access authority definition that has not been stored in the shared No 134, in the access authority definitions retained by the shared access authority table 133, is not being used by the memory protection unit 14.

Figure 6:
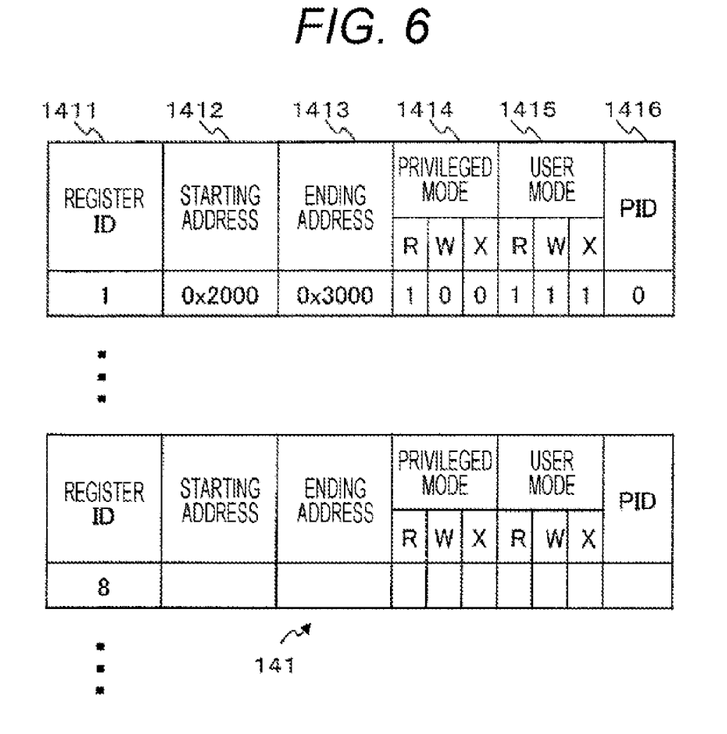
FIG. 6 illustrates an exemplary access authority definition stored in an access control register 141.

FIG. 6 illustrates an exemplary access authority definition stored in an access control register 141. One access control register 141 defines an access authority to one memory address area. The specific number of access control registers 141 is based on the specification of the memory protection unit 14.

Each access control register 141 includes, as data fields, a register ID 1411, a starting address 1412, an ending address 1413, a privileged mode 1414, a user mode 1415, and a PID 1416. The register ID 1411 includes the identifier of the access control register 141. The other fields are similar to the data fields of the access authority table 132.

Figure 7:
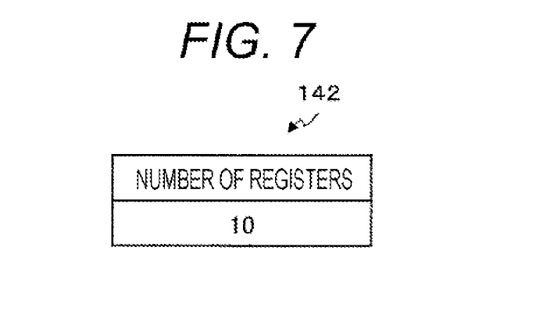
FIG. 7 illustrates exemplary data stored in register-number data 142.

FIG. 7 illustrates exemplary data stored in the register-number data 142. The register-number data 142 stores data indicating the number of access control registers 141. Here, the number is 10, but is not limited to this.

Figure 8:
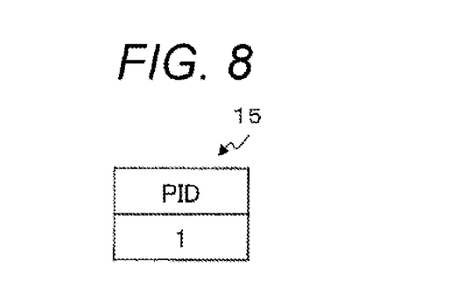
FIG. 8 illustrates exemplary data stored in a process identification register 15.

FIG. 8 illustrates exemplary data stored in the process identification register 15. The process identification register 15 stores the PID of shared software being currently executed by the central processing unit 11.

Figure 9:
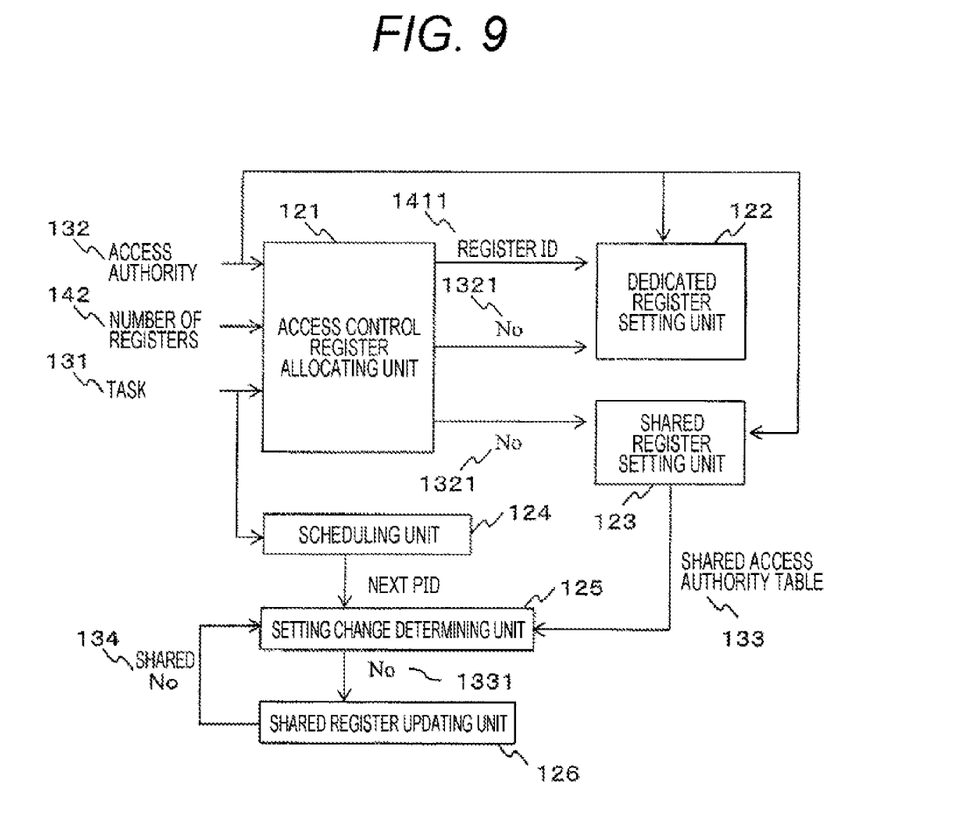
FIG. 9 is a diagram of a data flow between each functional unit included in the vehicle control device 1.

FIG. 9 is a diagram of a data flow between each functional unit included in the vehicle control device 1. The data flow will be described below in accordance with FIG. 9.

The access control register allocating unit 121 receives, as input, the access authority table 132, the register-number data 142, and the task table 131. The access control register allocating unit 121 allocates an access control register 141 to each task. Regarding a task to which an access control register 141 is allocated fixedly, the access control register allocating unit 121 notifies the dedicated register setting unit 122 of the register ID 1411 and the No 1321 thereof. Regarding a task to which an access control register 141 is to be allocated dynamically, the access control register allocating unit 121 notifies the shared register setting unit 123 of the No 1321 thereof.

The dedicated register setting unit 122 receives, as input, the access authority table 132, the register ID 1411, and the No 1321. The dedicated register setting unit 122 allocates the access authority definition specified by the No 1321, fixedly to the access control register 141 specified by the register ID 1411. The access control register 141 allocated fixedly is referred to as a dedicated register. The access control register 141 shared between tasks is referred to as a shared register.

The shared register setting unit 123 receives, as input, the access authority table 132 and the No 1321. The shared register setting unit 123 stores, as the shared access authority table 133, the access authority definition specified by the No 1321.

The scheduling unit 124 schedules the tasks on the basis of the task table 131. When selecting a task to be executed, the scheduling unit 124 outputs the PID 1315 of the task to be executed next.

The setting change determining unit 125 receives, as input, the PID 1315 to be executed next, the shared access authority table 133, and the shared No 134. The setting change determining unit 125 determines whether the access authority definition stored in the access control register 141 shared between the tasks is to be updated. For the determination of updating, the shared register updating unit 126 is notified of the updated No 1331.

The shared register updating unit 126 receives, as input, the No 1331. The shared register updating unit updates, by overwriting, the access control register 141 shared between the tasks with the access authority definition specified by the No 1331. The shared register updating unit 126 stores, as the shared No 134, the No 1331 updated by overwriting.

Figure 10:
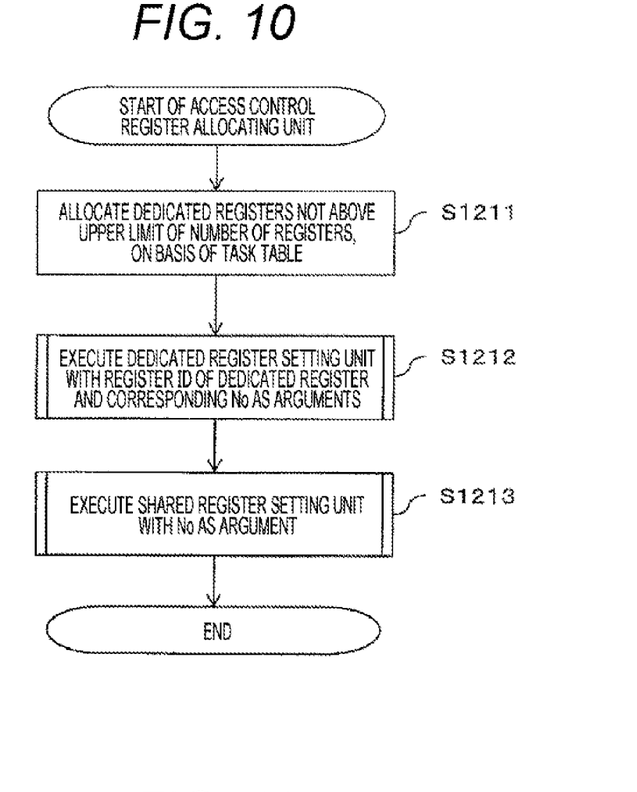
FIG. 10 is a flowchart for describing the operation of an access control register allocating unit 121.

FIG. 10 is a flowchart for describing the operation of the access control register allocating unit 121. Each step of FIG. 10 will be described below.

(FIG. 10: Step S1211)

The access control register allocating unit 121 allocates an access control register 141 fixedly to each task or part of the tasks described in the task table 131. For example, a dedicated register is allocated to a task in increasing order in the cycle 1313 or a task in decreasing order in the priority 1314, not above the register-number data 1421. Specifically, the access authority table 132 is searched for the PID 1327 corresponding to the PID 1315, to specify the corresponding record. In a case where the number of access control registers 141 is insufficient, at least one access control register 141 is kept as the shared register.

(FIG. 10: Step S1212)

With the register ID 1411 of an access control register 141 allocated as the dedicated register and the No 1321 corresponding to the access authority definition to be stored into the access control register 141, as arguments, the access control register allocating unit 121 calls the dedicated register setting unit 122. The operation of the dedicated register setting unit 122 will be described later.

(FIG. 10: Step S1213)

With the No 1321 corresponding to an access authority to be stored into the shared access authority table 133, as an argument, the access control register allocating unit 121 calls the shared register setting unit 123. The operation of the shared register setting unit 123 will be described later.

Figure 11:
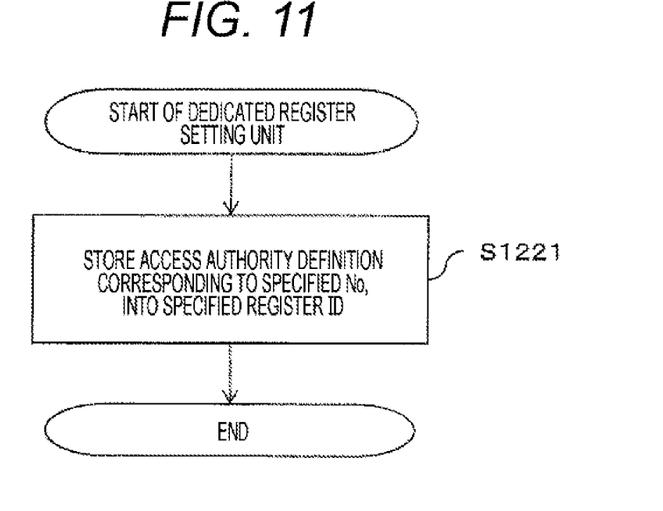
FIG. 11 is a flowchart for describing the operation of a dedicated register setting unit 122.

FIG. 11 is a flowchart for describing the operation of the dedicated register setting unit 122. The dedicated register setting unit 122 stores the access authority definition corresponding to the No 1321 received as the argument, into the access control register 141 having the register ID 1411 received as the argument (S1221).

Figure 12:
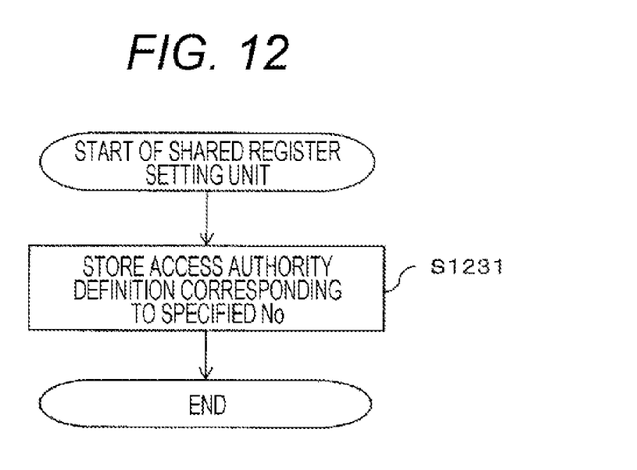
FIG. 12 is a flowchart for describing the operation of a shared register setting unit 123.

FIG. 12 is a flowchart for describing the operation of the shared register setting unit 123. The shared register setting unit 123 stores the access authority definition corresponding to the No 1321 received as the argument, into the shared access authority table 133 (S1231).

Figure 13:
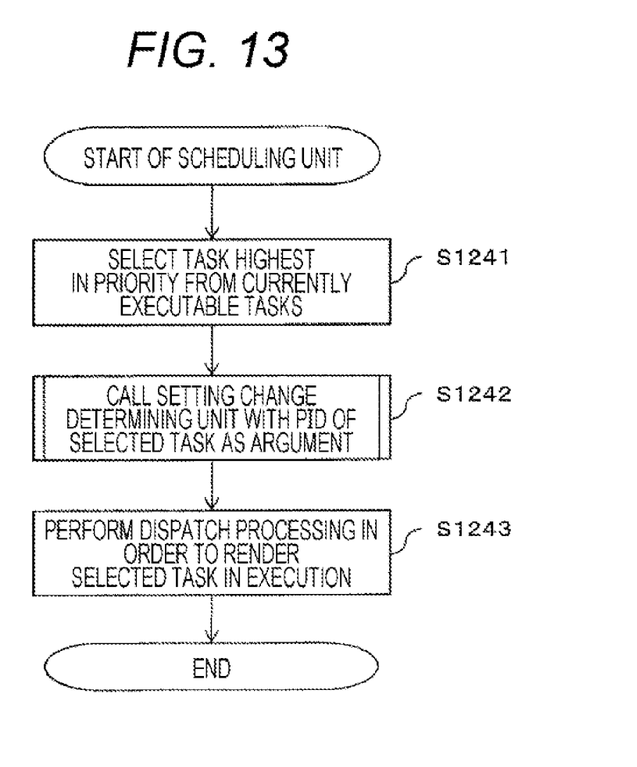
FIG. 13 is a flowchart for describing the operation of a scheduling unit 124.

FIG. 13 is a flowchart for describing the operation of the scheduling unit 124. Each step of FIG. 13 will be described below.

(FIG. 13: Step S1241)

The scheduling unit 124 extracts currently executable tasks from the tasks described in the task table 131. The scheduling unit 124 selects a task highest in the priority 1314 from the extracted tasks.

(FIG. 13: Step S1242)

In a case where the PID 1315 of the task selected at step S1241 belongs to shared software, the scheduling unit 124 calls the setting change determining unit 125 with the PID 1315 of the task as an argument. The operation of the setting change determining unit 125 will be described later.

(FIG. 13: Step S1243)

The scheduling unit 124 performs dispatch processing in order to render the task selected at step S1241 in execution.

Figure 14:
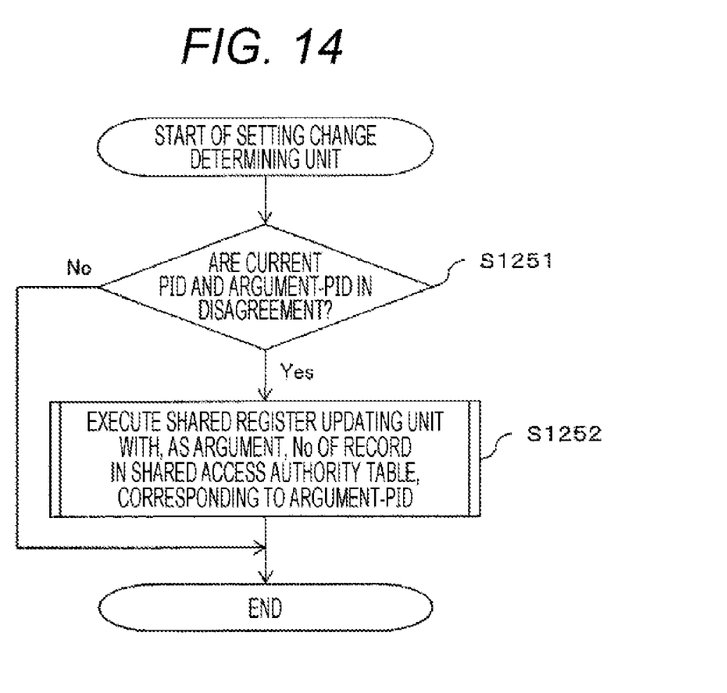
FIG. 14 is a flowchart for describing the operation of a setting change determining unit 125.

FIG. 14 is a flowchart for describing the operation of the setting change determining unit 125. Each step of FIG. 14 will be described below.

(FIG. 14: Step S1251)

The setting change determining unit 125 determines whether the PID 1315 received as the argument agrees with the PID of the task which is currently executed and stored in the process identification register 15. For agreement, the setting change determining unit 125 determines that the access authority definition corresponding to the PID 1315 does not require re-storing into the shared register. The present flowchart finishes. For disagreement, the processing proceeds to step S1252.

(FIG. 14: Step S1252)

The setting change determining unit 125 searches the shared access authority table 133 for a record having the PID 1337 identical to the PID 1315 received as the argument. The setting change determining unit 125 calls the shared register updating unit 126 with the No 1331 of the record as an argument. In a case where a plurality of records is applicable, similar processing is performed to each record.

Figure 15:
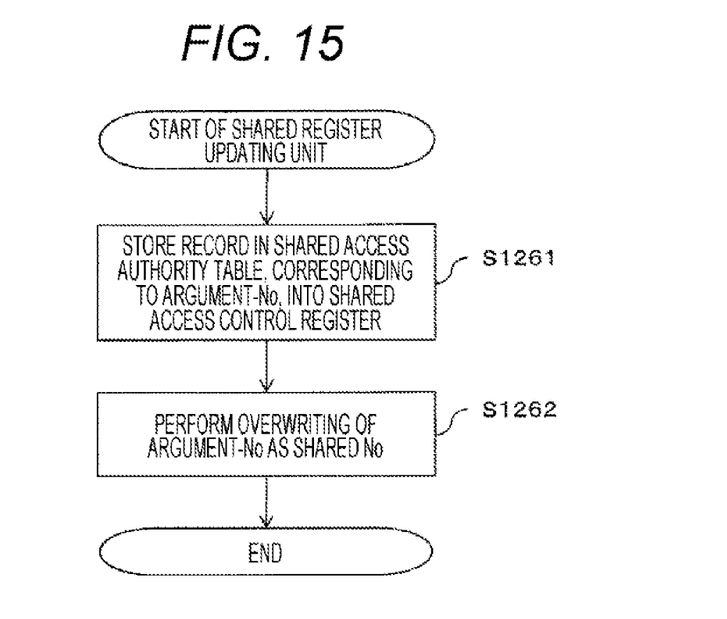
FIG. 15 is a flowchart for describing the operation of a shared register updating unit 126.

FIG. 15 is a flowchart for describing the operation of the shared register updating unit 126. Each step of FIG. 15 will be described below.

(FIG. 15: Step S1261)

The shared register updating unit 126 stores, by overwriting, the content of the record in the shared access authority table 133, corresponding to the No 1331 received as the argument, into the access control register 141. The register ID 1411 of the access control register 141 into which the record is to be written (namely, the shared register), may be reported in advance or may be reported as an argument.

(FIG. 15: Step S1262)

The shared register updating unit 126 stores, by overwriting, the No 1331 received as the argument, as the shared No 134.

Figure 16:
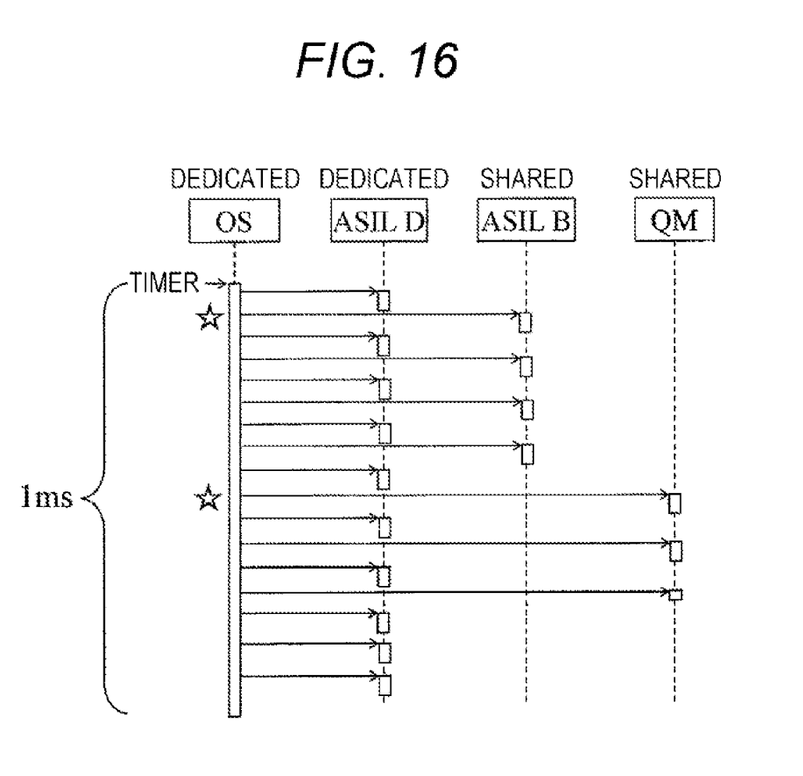
FIG. 16 is a time chart for describing timing at which the vehicle control device 1 executes tasks.

FIG. 16 is a time chart for describing timing at which the vehicle control device 1 executes tasks. Here, the operating system (OS) of the vehicle control device 1 and the ASIL-D software 127 each are allocated to a dedicated register, and the ASIL-B software 128 and the QM software 129 each are allocated to a shared register. Each asterisk indicates the timing at which the shared register updating unit 126 updates the shared register.

At step S1251, the setting change determining unit 125 determines that the shared register requires rewriting, only in a case where the PID 1315 of the shared software to be executed next is different from the PID in the process identification register 15. That is, the content of the shared register is changed only when the task allocated to the shared register requires changing. For example, as indicated with each asterisk of FIG. 16, while the ASIL-B software 128 is allocated to the shared register, the content of the shared register requires no changing. This arrangement enables inhibition of a load in processing even when the content of the shared register is rewritten dynamically.

First Embodiment: Conclusion

For the access authority when tasks each having a low execution-frequency or a low priority access the memory 12, the vehicle control device 1 according to the first embodiment causes an access control register 141 to be shared between the tasks, and writes, just before execution of a task, the access authority definition of the task into the shared register. This arrangement enables definition and use of the number of access authorities not less than the number of access control registers 141.

For the access authority when tasks each having a high execution-frequency or a high priority access the memory 12, the vehicle control device 1 according to the first embodiment allocates an access control register 141 fixedly to each task. This arrangement enables, for a task having a high execution-frequency or a high priority, constant acquisition of the access authority definition of the task from the corresponding access control register 141, resulting in real-time property.

Second Embodiment

Modifications for each functional unit and each data table described in the first embodiment, will be described in a second embodiment of the present invention. The other configurations are similar to those according to the first embodiment. Thus, the difference in the modifications will be mainly described below.

According to the first embodiment, each functional unit stored in the memory 12 is provided as software to be executed by the central processing unit 11. Instead of this arrangement, each functional unit can be implemented with hardware, such as a circuit device in which an equivalent function is implemented.

According to the first embodiment, the example in which one access authority is defined for every piece of software, has been described. However, a plurality of access authorities may be defined for each piece of software, and a switch may be made between the plurality of access authorities. For example, in a case where each piece of software accesses three memory address areas, three access authorities defined for every piece of software can be stored in mutually different access control registers 141 (nine access control registers 141 are required in total).

According to the first embodiment, the example in which memory protection is performed to the three types of software each having a different safety level, has been described. However, the number of safety levels is not limited to this.

According to the first embodiment, it is assumed that the vehicle control device 1 includes the central processing unit 11 having a single core. However, the central processing unit 11 may include a multi-core processor.

According to the first embodiment, the number of access authorities more than the number of operation modes of the central processing unit 11 can be defined by defining access authority for every PID 1327. Instead of identification of an access authority definition with the PID 1327, an access authority definition may be identified with processing on software.

According to the first embodiment, the allocation of a dedicated register to a task in increasing order in the cycle 1313 or a task in decreasing order in the priority 1314, has been described. Allocation of a dedicated register in priority to either the cycle 1313 or the priority 1314, can be determined arbitrarily. For example, it is considered that, first, a dedicated register is allocated in decreasing order in the priority 1314, and, next, a dedicated register is allocated in increasing order in the cycle 1313. For tasks identical in the cycle 1313, for example, a dedicated register can be allocated preferentially to a task higher in the priority 1314. Instead of use of the cycle 1313 or the priority 1314, a dedicated register may be allocated by specification of a user.

According to the first embodiment, the tasks to be executed periodically have been described. However, an access control register 141 can be allocated to interrupt processing not to be performed periodically, similarly to the periodic tasks. Use of the priority 1314 enables allocation of an access control register 141 to the interrupt processing. In a case where the tasks to be executed periodically and the interrupt processing are compared, allocation can be determined in comparison in the priority 1314. A dedicated register may be allocated unconditionally to the OS only as an exception.

For example, allocation of the access control registers 141 may be performed only once when the vehicle control device 1 starts up, or may be repeated every appropriate time. Instead of use of all the access control registers 141, only part of the access control registers 141 may be allocated.

According to the first embodiment, one safety level is allocated to one task. However, the embodiment is not limited to this. For example, a plurality of pieces of processing each having a different safety level may be performed in one task. Note that the performance is limited to a case where FFI is realized between the pieces of processing in the task.

A task allocated to a dedicated register can be set so as to be constantly effective even when the PID thereof is not described in the PID 1327. For example, masking the PID enables setting of the task allocated to the dedicated register such that the task is constantly effective.

According to the first embodiment, the PID 1327 is allocated in units of pieces of software, but the embodiment is not limited to this. For example, the PID 1327 can be allocated in units of functions, in units of groups, or in units of processor cores.

REFERENCE SIGNS LIST

1 vehicle control device
11 central processing unit
12 memory
121 access control register allocating unit
122 dedicated register setting unit
123 shared register setting unit
124 scheduling unit
125 setting change determining unit
126 shared register updating unit
131 task table
132 access authority table
133 shared access authority table
134 shared No
14 memory protection unit
141 access control register
142 register-number data
15 process identification register
16 input/output circuit

The invention claimed is:

1. A vehicle control device comprising:
a central processing unit configured to execute software of controlling an operation of a vehicle;
a memory storing data to be used by the central processing unit for the execution of the software; and
a memory protection unit configured to control an access authority to a storage area included in the memory, wherein
the memory protection unit includes a plurality of storage devices each storing information defining one access authority to the storage area,
part of the plurality of storage devices is allocated fixedly, in advance, to the storage area and a rest of the plurality of storage devices is allocated dynamically,
each of the plurality of storage devices allocated dynamically are shared by multiple tasks, and
the part of the plurality of storage devices allocated fixedly are each used only for a single task.

2. The vehicle control device according to claim 1, wherein the central processing unit executes a plurality of pieces of the software each having a different execution frequency or a different priority,
the entirety or the part of the plurality of storage devices is allocated fixedly, in advance, to an entirety or part of the plurality of pieces of the software in order of decreasing execution frequency or decreasing priority, and
the central processing unit allocates the rest of the plurality of storage devices dynamically to a rest of the plurality of pieces of the software.

3. The vehicle control device according to claim 1, wherein the part of the plurality of storage devices is allocated fixedly to a plurality of pieces of the software in order of decreasing priority, and
the rest of the plurality of storage devices is allocated fixedly to a rest of the plurality of pieces of the software in order of decreasing execution frequency.

4. The vehicle control device according to claim 1, wherein the central processing unit writes, before executing shared software that is the rest of a plurality of pieces of the software, information defining an access authority of the shared software to the storage area, into the rest of the plurality of storage devices, to allocate the rest of the plurality of storage devices dynamically to the shared software.

5. The vehicle control device according to claim 4, further comprising:
an ID storage unit configured to store an ID of the shared software to be executed by the central processing unit,
wherein the central processing unit writes, in a case where an ID stored in the ID storage unit is different from the ID of the shared software to be executed, the ID of the shared software to be executed into the ID storage unit, and
the central processing unit allocates, in a case where the ID stored in the ID storage unit is different from the ID of the shared software to be executed when the central processing unit starts to execute the shared software, the rest of the plurality of storage devices dynamically to the shared software to be executed.

6. The vehicle control device according to claim 1, wherein the plurality of storage devices each stores the information defining the access authority to the storage area for every combination of the storage area and an execution mode of the central processing unit, and
the memory protection unit controls the access authority to the storage area for every combination of the storage area and the execution mode of the central processing unit, in accordance with the information stored in each of the plurality of storage devices.

7. The vehicle control device according to claim 1, wherein the plurality of storage devices each stores the information defining the access authority to the storage area for every combination of the storage area and an ID of the software, and
the memory protection unit controls the access authority to the storage area for every combination of the storage area and the ID of the software, in accordance with the information stored in each of the plurality of storage devices.

8. The vehicle control device according to claim 1, wherein the central processing unit executes a plurality of pieces of the software each having a different safety level.

* * * * *